US006292435B1

(12) United States Patent
Savord et al.

(10) Patent No.: US 6,292,435 B1
(45) Date of Patent: Sep. 18, 2001

(54) CIRCUIT AND METHOD FOR EXCITING A MICRO-MACHINED TRANSDUCER TO HAVE LOW SECOND ORDER HARMONIC TRANSMIT ENERGY

(75) Inventors: Bernard J Savord, Andover; William J Ossmann, Acton, both of MA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/521,131

(22) Filed: Mar. 8, 2000

Related U.S. Application Data

(60) Provisional application No. 60/133,411, filed on May 11, 1999.

(51) Int. Cl.[7] .......... H04B 1/02
(52) U.S. Cl. .......... 367/138
(58) Field of Search .......... 367/138, 11, 7; 600/443, 458; 73/642

(56) References Cited

U.S. PATENT DOCUMENTS

| | | | |
|---|---|---|---|
| 5,619,476 | 4/1997 | Haller et al. | 367/181 |
| 5,675,554 | 10/1997 | Cole et al. | 367/38 |
| 5,740,128 | 4/1998 | Hossack et al. | 367/138 |
| 5,870,351 | 2/1999 | Ladabaum et al. | 367/163 |
| 5,894,452 | 4/1999 | Ladabaum et al. | 367/163 |
| 5,982,709 | 11/1999 | Ladabaum et al. | 367/170 |
| 6,004,832 | 12/1999 | Haller et al. | 438/50 |
| 6,193,659 * | 2/2001 | Ramamurthy et al. | 600/443 |

* cited by examiner

*Primary Examiner*—Daniel T. Pihulic

(57) ABSTRACT

A circuit and method for predistorting an input pulse to a micro-machined ultrasonic transducer (MUT) compensates for non-linearities in the transducer, thus allowing the transducer to provide a compensated output pressure wave having a low second order harmonic transmit energy. In another aspect of the invention, the output power of a MUT may be controlled.

21 Claims, 13 Drawing Sheets

CIRCUIT AND METHOD FOR EXCITING A MICRO-MACHINED TRANSDUCER TO HAVE LOW SECOND ORDER HARMONIC TRANSMIT ENERGY

This application claims the benefit of the filing date pursuant to 35 U.S.C. §119(e) of Provisional Application Ser. No. 60/133,411, filed May 11, 1999.

TECHNICAL FIELD

The present invention relates generally to ultrasonic transducers, and, more particularly, to a micro-machined ultrasonic transducer that is excited with a modified transmit pulse resulting in low second order harmonic transmit energy.

BACKGROUND OF THE INVENTION

Ultrasonic transducers have been available for quite some time and are useful for interrogating solids, liquids and gasses. One particular use for ultrasonic transducers has been in the area of medical imaging. Ultrasonic transducers are typically formed of piezoelectric elements. The elements typically are made of material such as lead zirconate titanate (abbreviated as PZT), with a plurality of elements being arranged to form a transducer assembly. The transducer assembly is then further assembled into a housing possibly including control electronics, in the form of electronic circuit boards, the combination of which forms an ultrasonic probe. This ultrasonic probe, which may include acoustic matching layers between the surface of the PZT transducer element or elements and the probe body, may then be used to send and receive ultrasonic signals through body tissue.

One limitation of PZT devices, in ultrasonic imaging applications, is that the acoustic impedance is approximately 30–35 MRayls (kg/m$^2$s), while the acoustic impedance of the human body is approximately 1.5 MRayls. Because of this large impedance mismatch, acoustic matching layers are needed to match the PZT impedance to the body impedance. Acoustic matching layers work using a ¼ wave resonance principle and are therefore narrow band devices, their presence thus reducing the available bandwidth of the PZT transducer. In order to achieve maximum resolution, it is desirable to operate at the highest possible frequency and the highest possible bandwidth.

In order to address the shortcomings of transducers made from piezo-electric materials, a micro-machined ultrasonic transducer (MUT), as described in U.S. Pat. No. 5,619,476 to Haller, et al., has been developed. Micro-machined ultrasonic transducers of this type address the shortcomings of PZT transducers by, among other attributes, being fabricated using semi-conductor fabrication techniques on a silicon substrate. The MUT's are formed using known semiconductor manufacturing techniques resulting in a capacitive non-linear ultrasonic transducer that comprises, in essence, a flexible membrane supported around its edges over a silicon substrate. By applying contact material to the membrane, or a portion of the membrane, and to the silicon substrate and then by applying appropriate voltage signals to the contacts, the MUT may be energized such that an appropriate ultrasonic wave is produced. Similarly, the membrane of the MUT may be used to receive ultrasonic signals by capturing reflected ultrasonic energy and transforming that energy into movement of the membrane, which then generates a receive signal. When imaging the human body, the membrane of the MUT moves freely with the imaging medium, thus eliminating the need for acoustic matching layers. Therefore, transducer bandwidth is greatly improved.

PZT transducers have a generally linear relationship between acoustic pressure and applied voltage. As such, this linear relationship preserves the harmonic nature of the applied voltage waveform.

When using a MUT in an ultrasonic imaging application, such as harmonic imaging, it is desirable to excite the MUT to create an input pulse using an input frequency (f1) and then use the MUT to receive reflected energy at a receive frequency (f2). Typically, the input frequency is in the range of 1.8 MHz and the receive frequency is in the range of 3.6 MHz. A human body, as well as ultrasonic contrast agents, which may be injected to enhance an ultrasonic image, are non-linear so that when imaging human tissue, the body reflects an ultrasonic input pulse at a frequency twice that of the input pulse. One of the shortcomings of MUT's, however, is that they have a non-linear relationship between voltage and pressure, as shown by the following equation:

$$P=eV^2/2(x+T\backslash Er)^2, \qquad \text{(Eq.1)}$$

where V=applied voltage,

X=MUT vacuum gap thickness, e=permittivity constant,

T=thickness of MUT membrane (top and bottom combined),

Er=relative dielectric constant of MUT membrane.

The non-linear relationship between acoustic pressure and applied voltage in a MUT produces a distorted pressure waveform resulting in a spectrum having unacceptably high second order harmonic energy. This second harmonic energy on the transmit pulse interferes with the image reflected by the tissue under analysis resulting in both f2 being received at the MUT and the reflection of f2 (that of the second harmonic energy appearing as a linear component) being received. This condition results in both a linear component being received and a non-linear component being received.

Therefore it would be desirable for a MUT to produce a non-distorted pressure waveform having maximum possible second order harmonic rejection characteristics.

SUMMARY OF THE INVENTION

The invention provides a circuit for exciting micro-machined ultrasonic transducer in which a shaped input pulse allows the MUT to produce a desirable transmit pulse having very high second order harmonic rejection.

In architecture, the present invention may be conceptualized as a circuit for exciting a micro-machined ultrasonic transducer (MUT), the MUT having non-linear input-output characteristics, waveform circuitry configured to develop a predistorted waveform, the predistorted waveform related at least in part to the non-linear characteristics; and driver circuitry coupled to the waveform circuitry, the driver circuitry configured to apply the predistorted waveform to the MUT.

The present invention may also be conceptualized as a method for exciting a micro-machined ultrasonic transducer (MUT), the MUT having non-linear input-output characteristics, the method comprising the step of: applying to the MUT a predistorted waveform, the predistorted waveform related at least in part to the non-linear characteristics such that the predistorted waveform compensates for the non-linear response of the MUT, the predistorted waveform resulting in an output pressure wave of the MUT, the output pressure wave having less second order harmonic energy than if the MUT were excited by a non-predistorted waveform.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF THE PREFERRED EMBODIMENT

The invention to be described hereafter is applicable to micro-machined ultrasonic transducers excited by either analog or digital waveforms, however, for simplicity, will be described in the context of applying an analog input wave. Furthermore, the concepts of the present invention are applicable at various interrogation and receive frequencies and bandwidths.

Furthermore, for simplicity in the description to follow, only the principal elements of the device driver circuitry used to generate the input pulses of the present invention will be illustrated.

Figure 1:
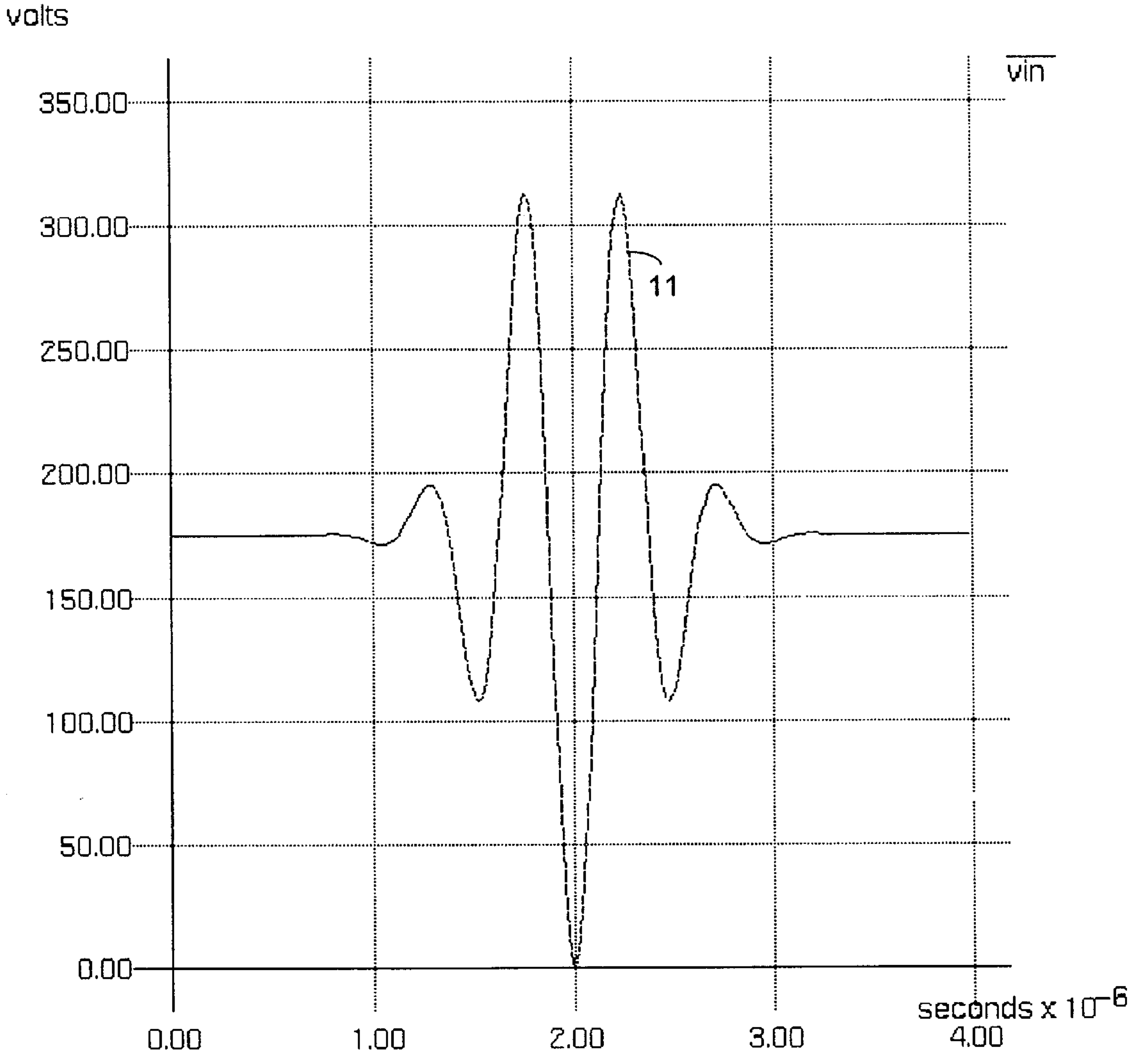
FIG. 1 is a graphical representation illustrating a standard input pulse applied to a micro-machined ultrasonic transducer.

Turning now to the drawings, FIG. 1 is a view illustrating a standard input signal applied to a MUT. As can be seen, input pulse 11 is a Gaussian envelope with an RF carrier. Although illustrated herein as a Gaussian distribution, input pulse 11 may assume other non-Gaussian forms. As can be seen, input pulse 11 contains significant energy in the region of 2 MHz (the fundamental frequency, f) and little or no energy in the region of 4 MHz (twice the fundamental frequency, f2).

Figure 2A:
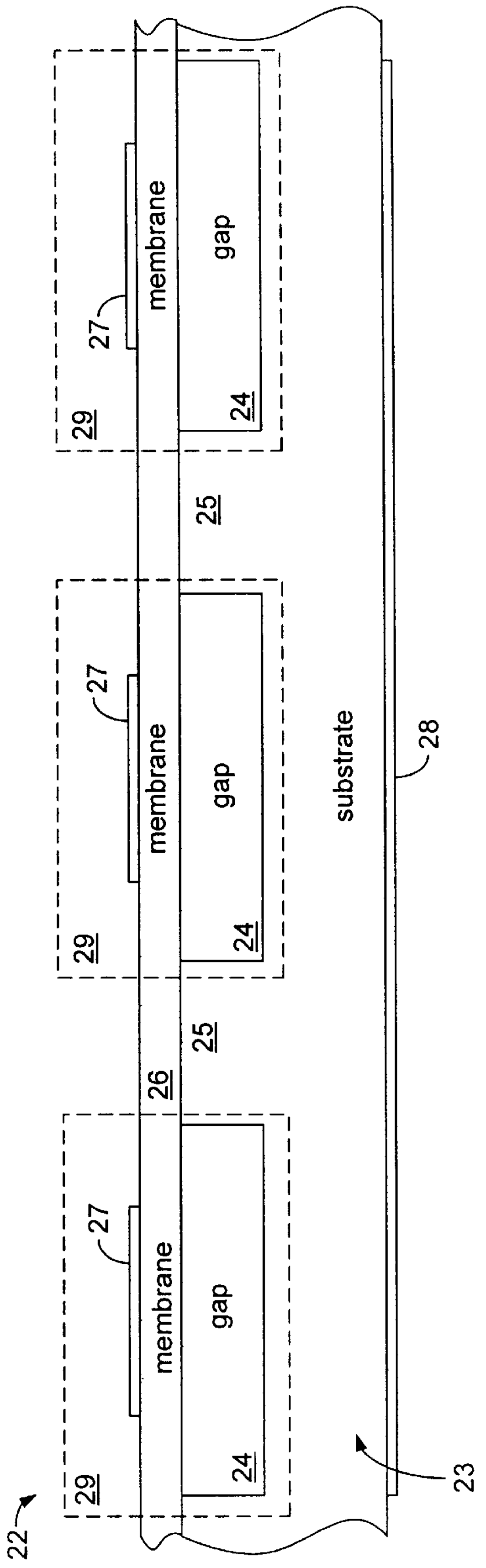
FIG. 2A is a cross-sectional schematic view illustrating a micro-machined ultrasonic transducer.

FIG. 2A is a simplified cross-sectional schematic view illustrating a MUT element 22. MUT element 22 is comprised of a plurality of MUT cells 29. MUT cells 29 are formed over a semiconductor substrate 23, which also forms the support elements 25 for membrane 26. Membrane 26 is a flexible membrane. Membrane 26, support elements 25 and substrate 23 define a gap 24. An electrode 28 is applied to one surface of substrate 23 and electrode 27 is applied over membrane 26. When MUT cell 29 is used in a transmitting application membrane 26 oscillates when excited by voltage applied to electrodes 27 and 28. When MUT cell 29 is used in a receive application, acoustic pressure impinging upon membrane 26 is converted to electrical energy, thus causing a receive signal to be developed. The size of gap 24 determines the acoustic performance of the MUT cell.

Figure 2B:
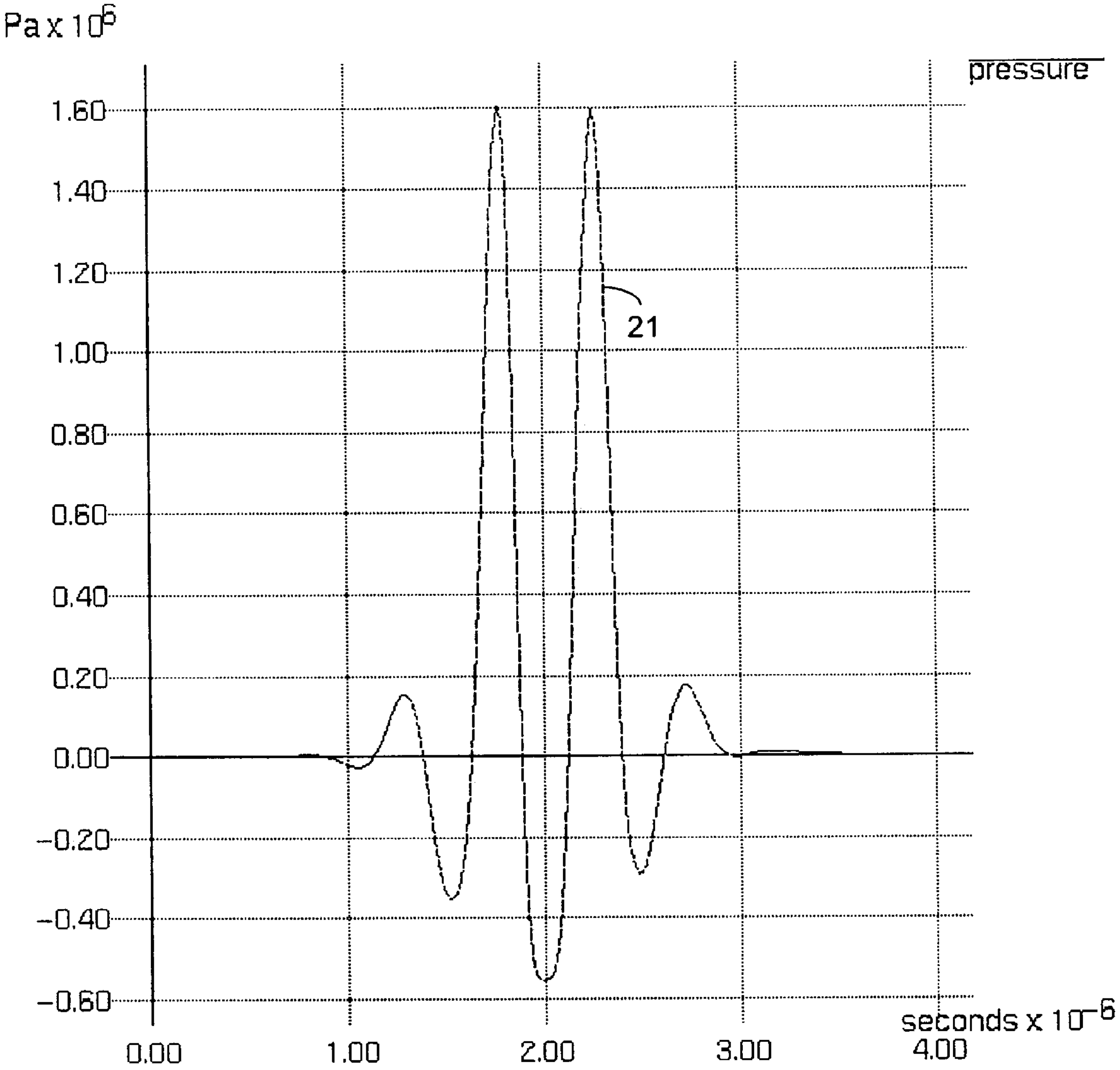
FIG. 2B is a graphical representation illustrating a distorted pressure waveform produced by a micro-machined ultrasonic transducer using the input pulse of FIG. 1.

FIG. 2B is a graphical representation illustrating a distorted pressure waveform produced by a MUT that is excited by the input waveform of FIG. 1. As can be seen, pressure waveform 21 is distorted due to non-linearities within the MUT. Specifically, Equation 1, as recited above, illustrates two non-linearities within a MUT. The first non-linearity arises from the fact that the voltage term is squared, and the second non-linearity arises because the gap thickness X of the MUT, (i.e., the dimension of gap 24 of FIG. 2A) varies with the acoustic signal. This means that as the membrane 26 of a MUT is oscillating, or vibrating, the gap thickness 24 formed by the membrane varies with the acoustic signal. These two non-linearities produce the distorted pressure waveform 21 of FIG. 2B.

Figure 3:
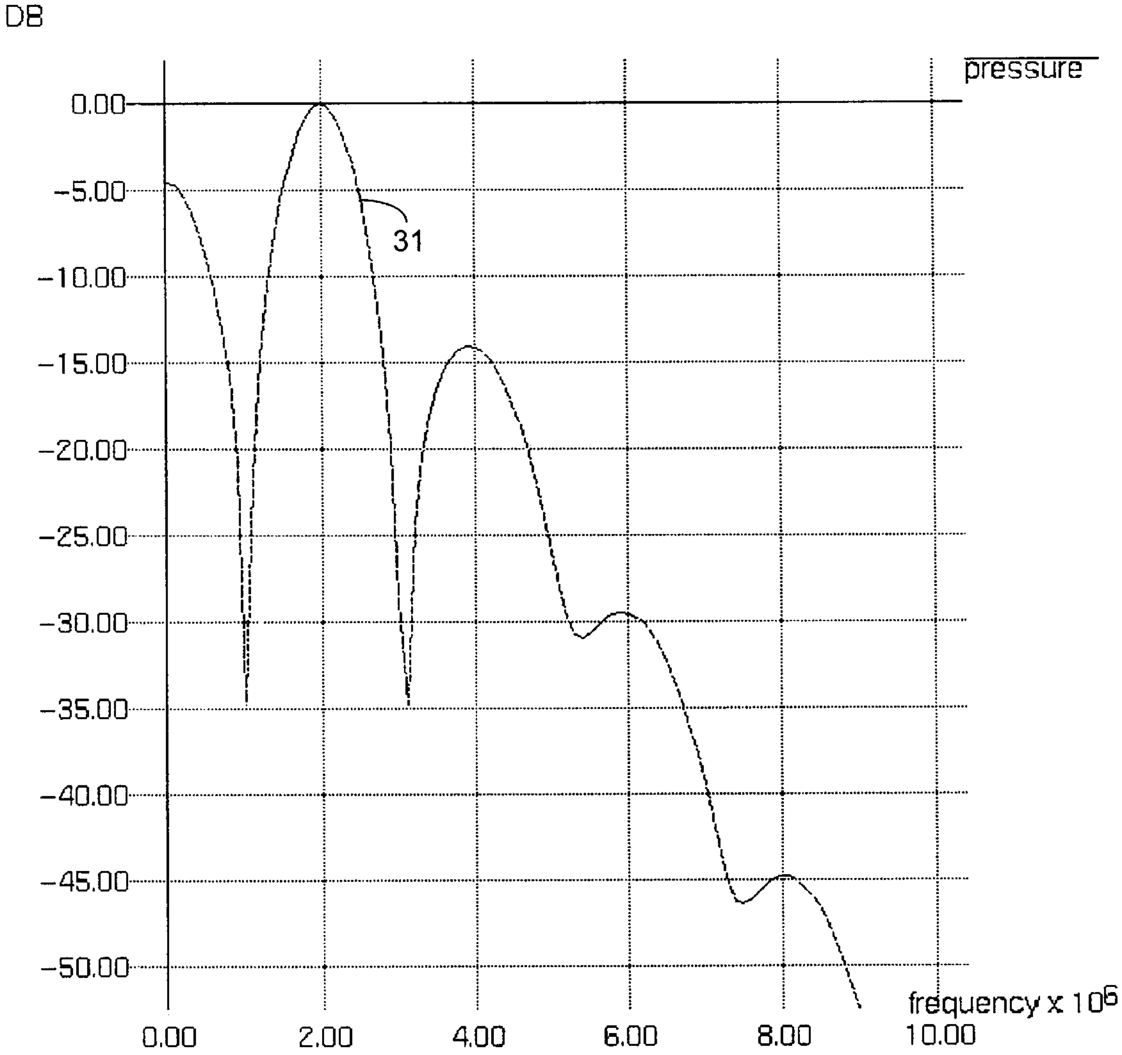
FIG. 3 is a graphical representation illustrating a distorted pressure spectrum of a micro-machined ultrasonic transducer produced using the input pulse of FIG. 1.

FIG. 3 is a graphical representation of a distorted pressure spectrum 31 of a MUT generated by the distorted pressure waveform 21 of FIG. 2. As can be seen, the fundamental frequency at 2 MHz is accompanied by significant harmonic energy at 4 MHz. This harmonic energy appears to be at a level that is only 14 dB below that of the fundamental frequency at 2 MHz. This condition results in undesirable second harmonic energy, which interferes significantly with the second frequency (f2) returned through the tissue being interrogated.

In accordance with one aspect of the present invention, input pulse 11 of FIG. 1 is predistorted in such a way as to compensate for the non-linearities of the MUT, prior to the input pulse being applied to the MUT.

Prior to discussing three embodiments for practicing the concepts of the present invention, it should be noted that the acoustic pressure P can be expressed in terms of stored charge Q. Note the following Equation 2 in which $$P=Q^2/2eA^2, \qquad \text{(Eq.2)}$$

where P=acoustic pressure out of the transducer,

Q=charge stored on the capacitor of the transducer, e=permittivity constant, and A equals area of the transducer element.

An advantage of expressing the acoustic pressure in this manner is that the non-linearity associated with the gap width X disappears. Noticing Equation 2, it follows that the non-linearity in charge (Q) can be removed by predistorting the desired input pulse with a square root function. This is possible because as shown in Equation 2, the charge function is squared. Equation 3 illustrates this concept.

$$Q=\text{Applied Charge}=\text{Sqrt}(A+Axe^{-(t/0.5\ \mu s)2}$$

$$\cos(2\times PI\times 2\ MHz\times t)), \quad (Eq.3)$$

where t=time,

PI=3.14159, and

A=constant.

Figure 4A:
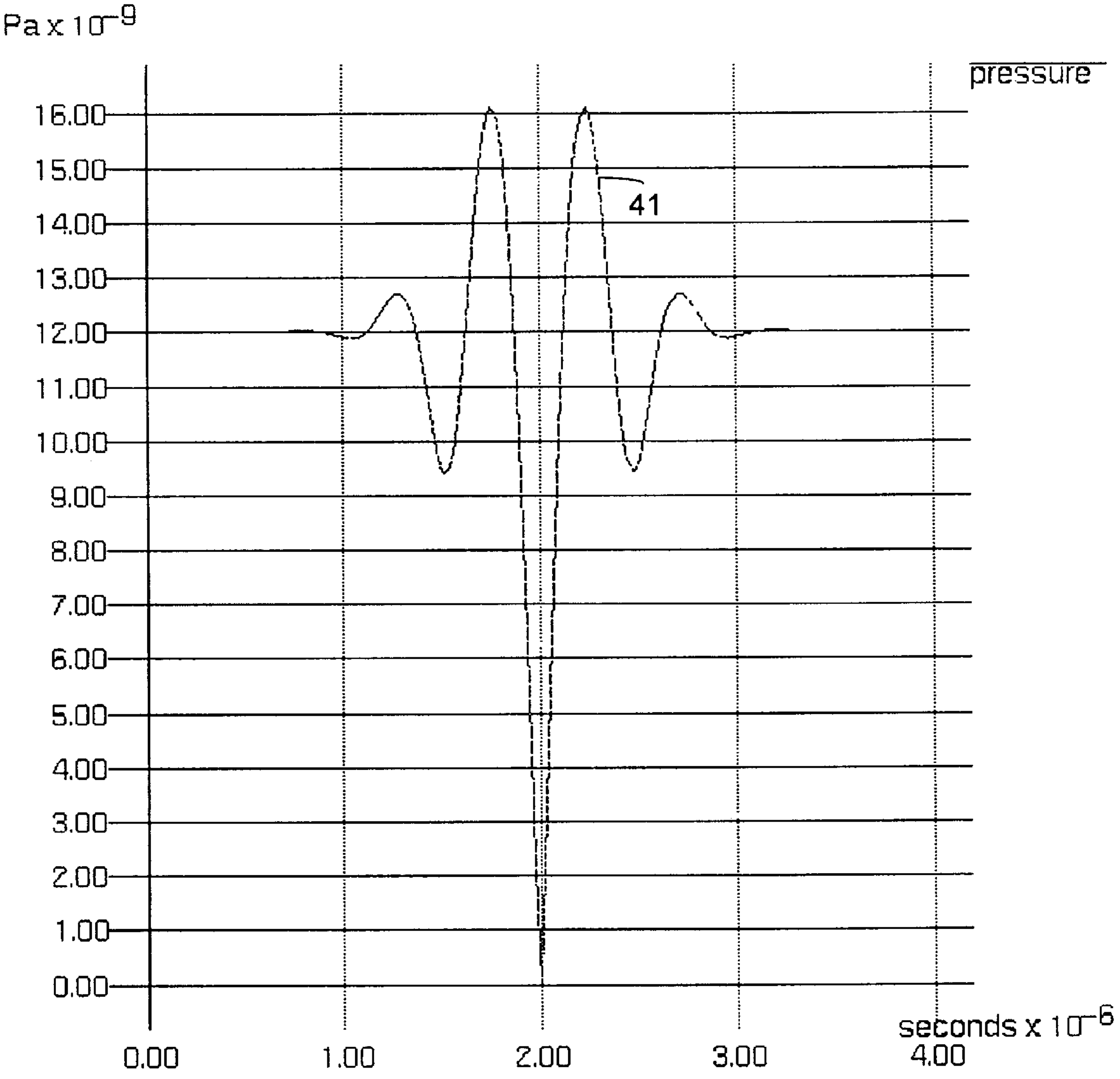
FIG. 4A is a graphical representation illustrating a predistorted charge waveform applied to a micro-machined ultrasonic transducer in accordance with one aspect of the present invention.

FIG. 4A is a graphical representation illustrating the predistorted charge waveform generated using Equation 3. As can be seen, input pulse 41 is predistorted in a manner that cancels the non-linearities inherent in a MUT. Predistorted charge waveform 41 may be applied using the charge amplifier circuit 40 illustrated in FIG. 4B.

In the description to follow, three digital implementations will be described for applying a predistorted waveform input to the MUT. Alternatively, analog circuitry, an example of which will be described with reference to FIG. 9, may be used to apply the predistorted waveform of the present invention to a MUT.

Figure 4B:
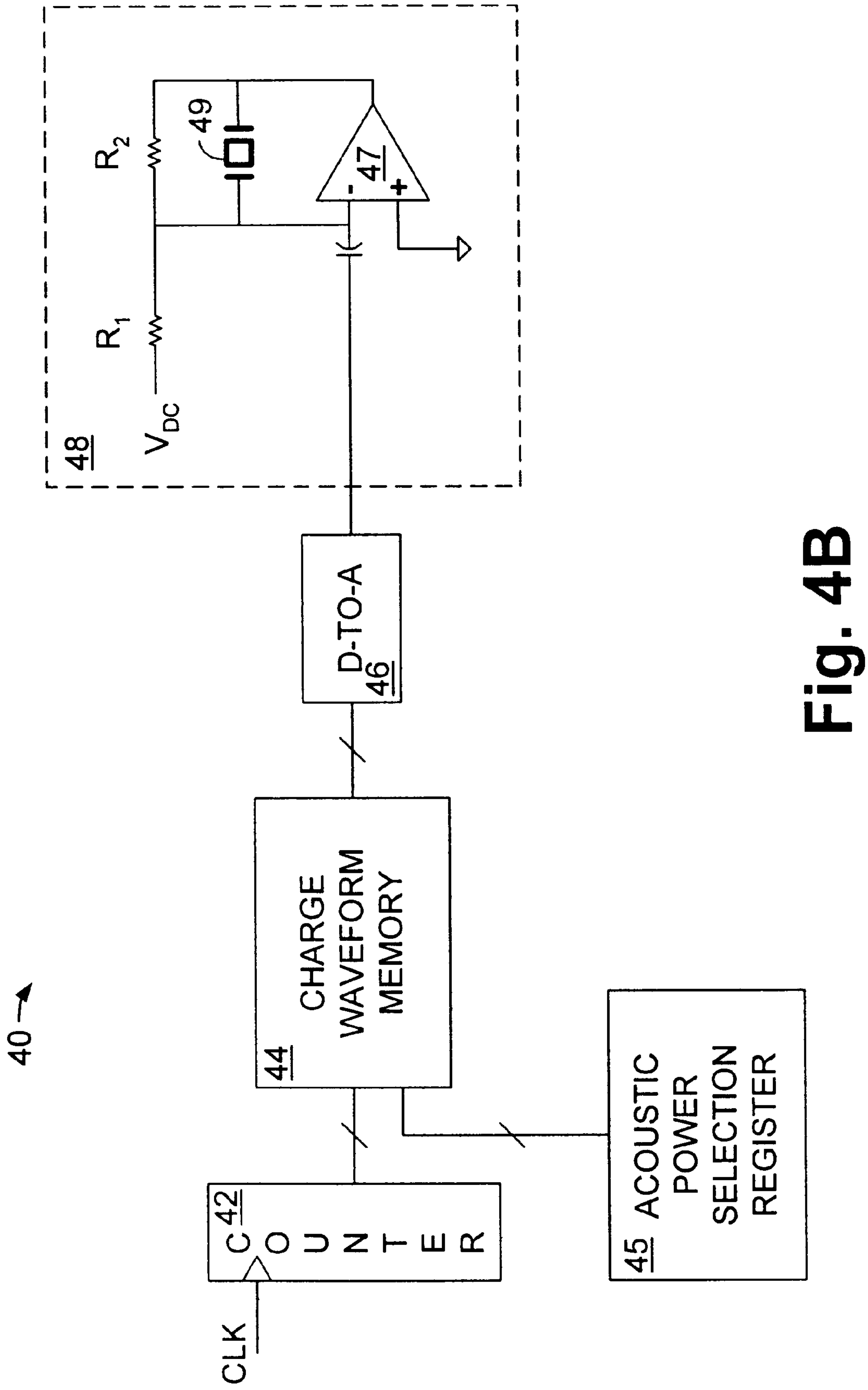
FIG. 4B is a schematic view illustrating a waveform generator with charge amplifier used to generate the predistorted charge waveform of FIG. 4A.

Turning now to FIG. 4B, shown is a schematic view illustrating a waveform generator with charge amplifier 40 that may be used to apply the predistorted charge waveform of FIG. 4A. Charge waveform memory device 44 contains logic configured to operate on a normal input pulse 11 (FIG. 1) in order to generate the predistorted charge waveform 41 of FIG. 4A through operation of Equation 3. In essence, charge waveform memory 44 includes logic that will apply the function of Equation 3 to any input pulse resulting in a predistorted input waveform. Digital-to-Analog (D-to-A) converter 46 receives the output of charge waveform memory device 44 and supplies an analog input signal to charge amplifier circuit 48. It should be noted that while shown in this embodiment using a D-to-A converter, the concepts of the present invention apply equally to digital input signals as well as analog input signals. Charge amplifier circuit 48 schematically includes MUT 49. $V_{DC}$ supplies a DC voltage to MUT 49 while operational amplifier 47 applies the predistorted input pulse. Resistors $R_1$ and $R_2$ set the DC bias for MUT 49. It should be noted that the circuit of FIG. 4B is a simplified circuit illustrating one possible configuration of major components used to supply the predistorted input pulse to MUT 49 and indeed may be implemented in other ways. For example, a digital signal processor may be used in place of the counter and memory element to calculate the predistorted waveform.

In another aspect, the present invention may be used to adjust the acoustic output power of a MUT. In the past, because the available ultrasonic transducers were linear, the output power of ultrasonic transducers was controlled simply by scaling the input power signal. Because MUTs are non-linear devices, merely scaling the input power still results in a non-linear input signal and will not directly effect on the output power. By predistorting the input pulse in a non-linear fashion as described above, the present invention may be used to effectively vary the output power of a MUT. In order to vary the output power of a MUT, the input waveform shape can be varied by using the principles of the present invention to predistort the input wave not just in amplitude but also the actual waveform shape. In this manner, the output power of a MUT may be precisely controlled.

Acoustic power selection register 45 may be implemented to vary the output power of the MUT 49 and may be a storage register that may index the charge waveform memory device 44 to select different waveforms within the memory. These waveforms may have different amplitudes and shapes, thus enabling acoustic power selection register 45 to control the output power of MUT 49.

Figure 7:
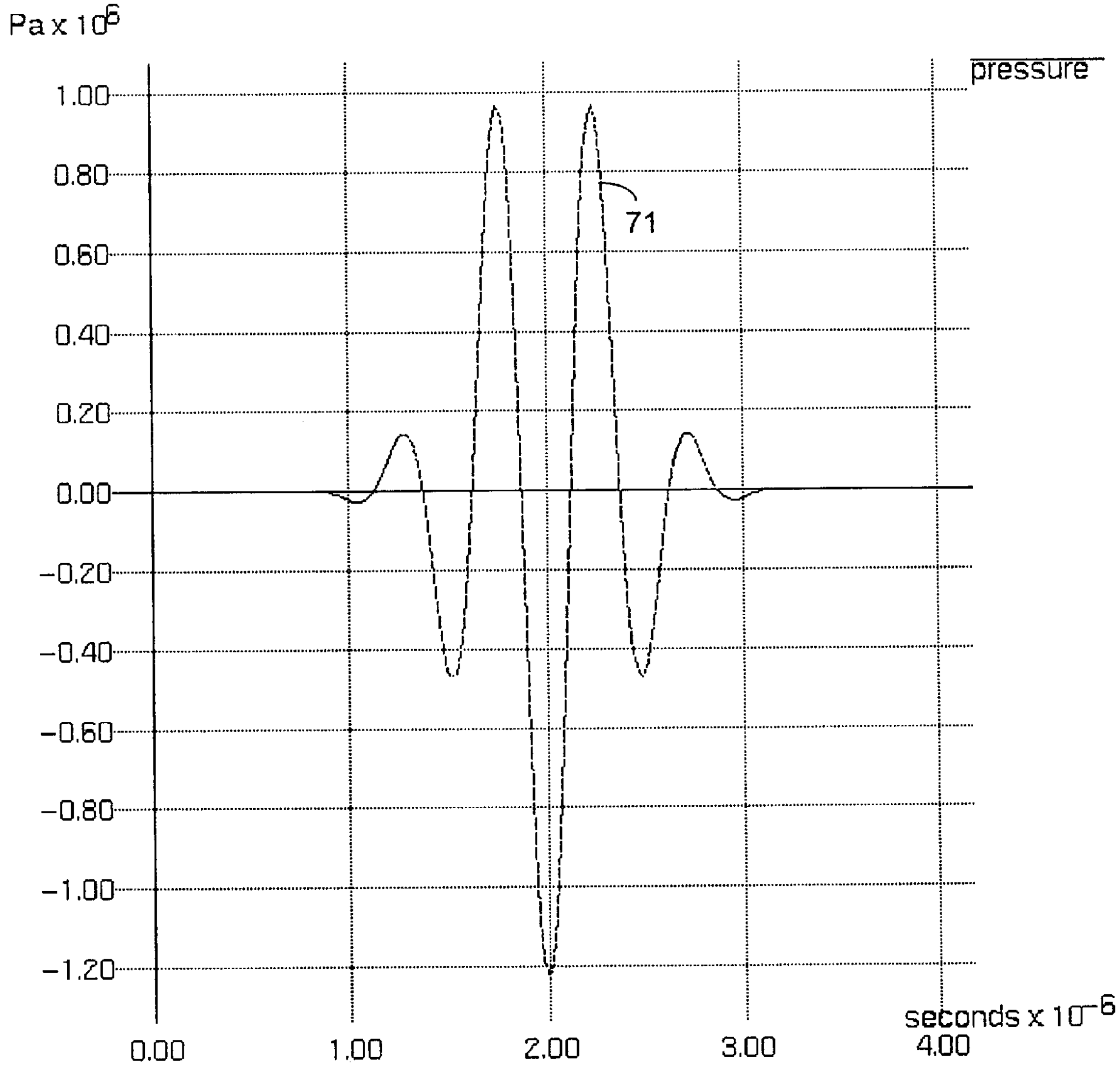
FIG. 7 is a graphical representation illustrating a compensated pressure waveform resulting from a micro-machined ultrasonic transducer excited by the predistorted waveforms of FIGS. 4A, 5A, and 6A.

FIG. 7 is a graphical representation illustrating a compensated pressure waveform 71 output from a MUT. Compensated pressure waveform 71 is a result of applying predistorted charge waveform 41 of FIG. 4A to a micro-machined ultrasonic transducer. As can be seen, the compensated pressure waveform 71 of FIG. 7 closely resembles the input pulse 11 of FIG. 1 with the exception that a degree of bias voltage is present. This indicates that the non-linearities within the MUT have been compensated.

Figure 8:
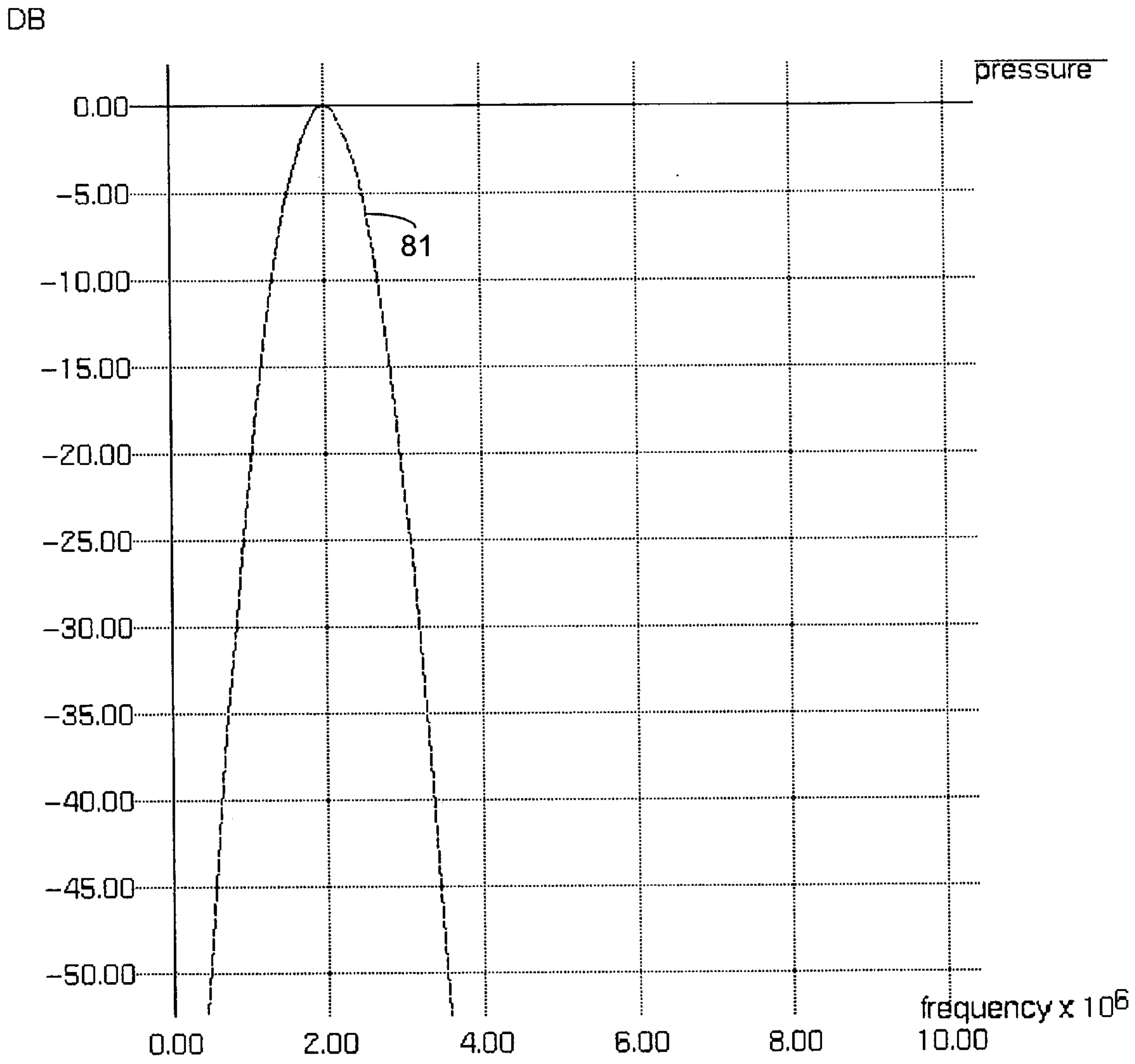
FIG. 8 is a graphical representation illustrating a compensated pressure spectrum resulting from a micro-machined ultrasonic transducer excited by the predistorted waveforms of FIGS. 4A, 5A, and 6A.

FIG. 8 is a graphical view illustrating a computer simulation of a compensated pressure spectrum 81 resulting from the input of predistorted charge waveform 41. As can be seen, more than 50 dB second order harmonic rejection is present at 4 MHz indicating a desirable pressure spectrum. Actual second order harmonic rejection is likely to be less than that illustrated in the computer simulation.

Figure 5A:
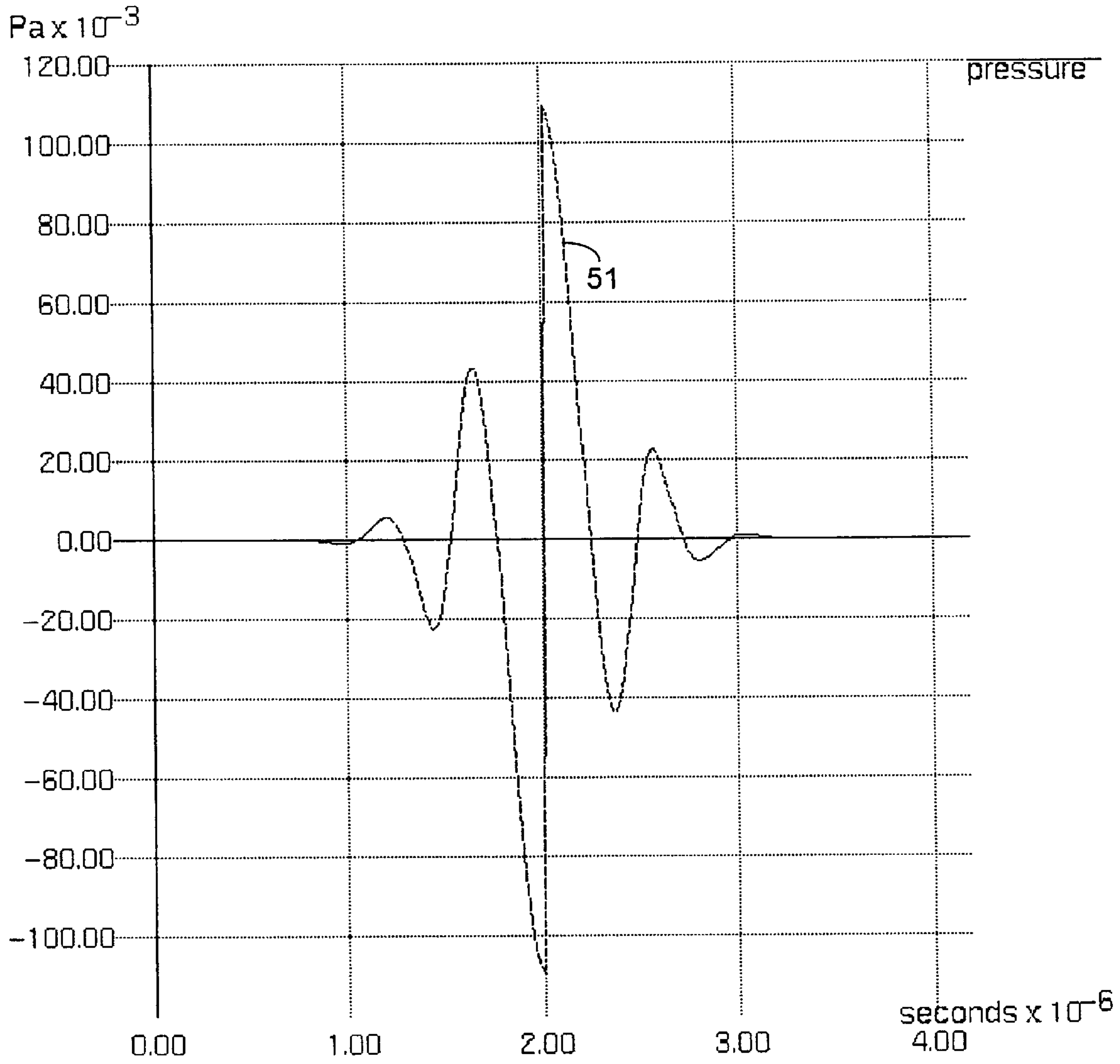
FIG. 5A is a graphical representation of a predistorted current waveform in accordance with another aspect of the present invention.

FIG. 5A is a graphical view illustrating an alternative embodiment of the predistorted waveform input of the present invention. FIG. 5A illustrates predistorted current waveform 51, which may be applied using the waveform generator with transconductance amplifier 50 of FIG. 5B. The predistorted current waveform 51 of FIG. 5A is developed by using Equation 4 as follows:

$$I=dQ/dt. \quad (Eq.4)$$

Figure 5B:
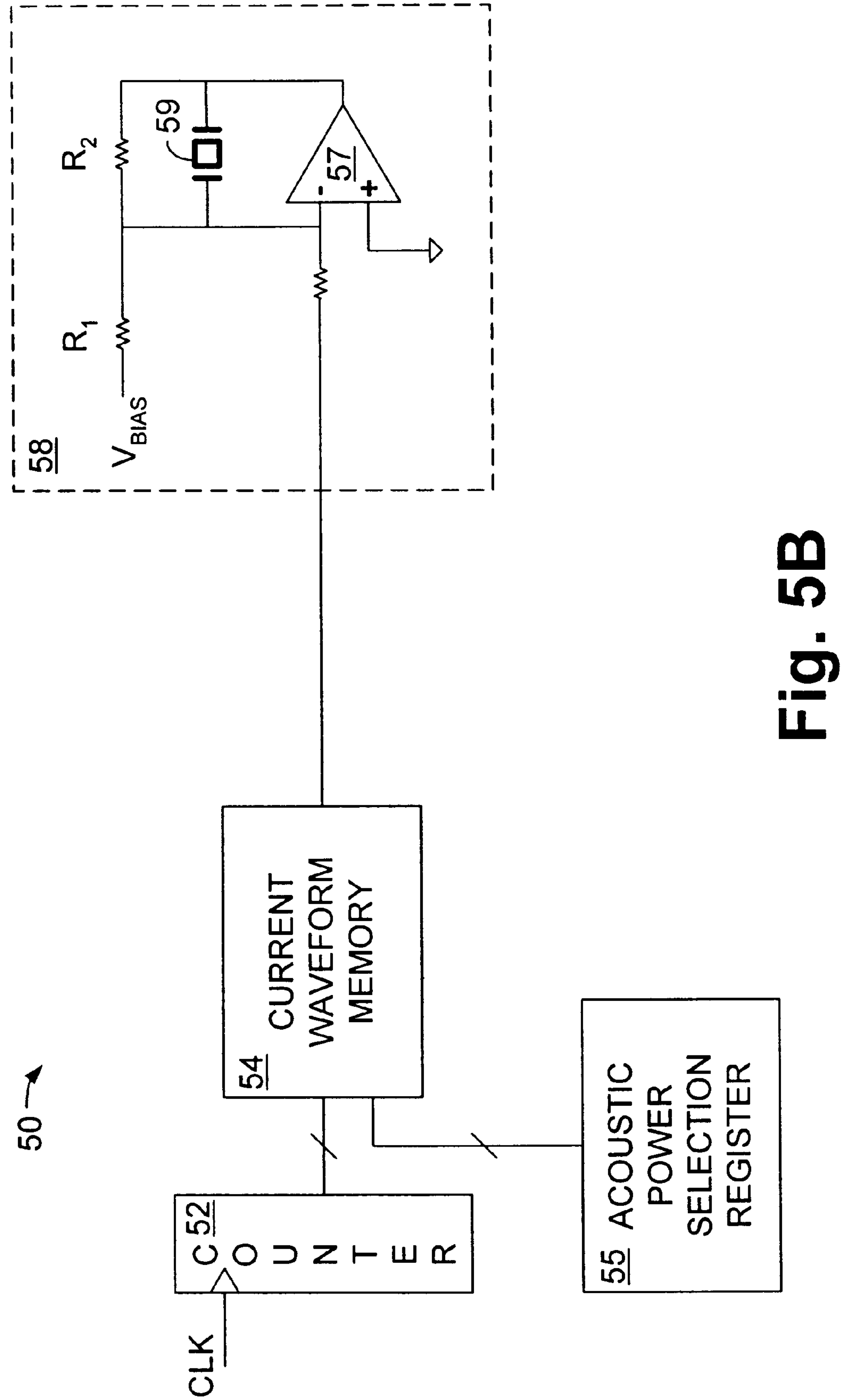
FIG. 5B is a schematic view illustrating a waveform generator with transconductance amplifier used to apply the predistorted current waveform of FIG. 5A to a micro-machined ultrasonic transducer.

In similar fashion to that described with reference to FIG. 4B, the waveform generator with transconductance amplifier 50 of FIG. 5B includes counter 52 and current waveform memory device 54. Current waveform memory device 54 stores a mathematical representation of predistorted current waveform 51 and applies predistorted current waveform 51 to transconductance amplifier 58. It should be noted here also that the concepts of the present invention apply equally to digital input signals as well as analog input signals.

Transconductance amplifier circuit 58 schematically includes MUT 59. Voltage $V_{bias}$ supplies a bias voltage to MUT 59 while operational amplifier 57 applies the predistorted input pulse. Resistors $R_1$ and $R_2$ set the DC bias on MUT 59 It should be noted that the circuit of FIG. 5B is a simplified circuit illustrating one possible configuration of major components used to supply the predistorted input pulse to MUT 59 and indeed may be implemented in other ways.

In similar fashion to that described above with respect to FIG. 4B, the output power of MUT 59 may be controlled. Acoustic power selection register 55 may be implemented to vary the output power of the MUT 59 and may be a storage register that may index the current waveform memory device 54 to select different waveforms within the memory. These waveforms may have different amplitudes and shapes, thus enabling acoustic power selection register 55 to control the output power of MUT 59.

In similar fashion to that obtained using predistorted charge waveform of FIG. 4A, the predistorted current waveform 51 of FIG. 5A results in the compensated pressure waveform 71 illustrated in FIG. 7 and also results in the compensated pressure spectrum 81 illustrated in FIG. 8. The pressure spectrum of FIG. 8 is substantially free of second order harmonic energy.

Figure 6A:
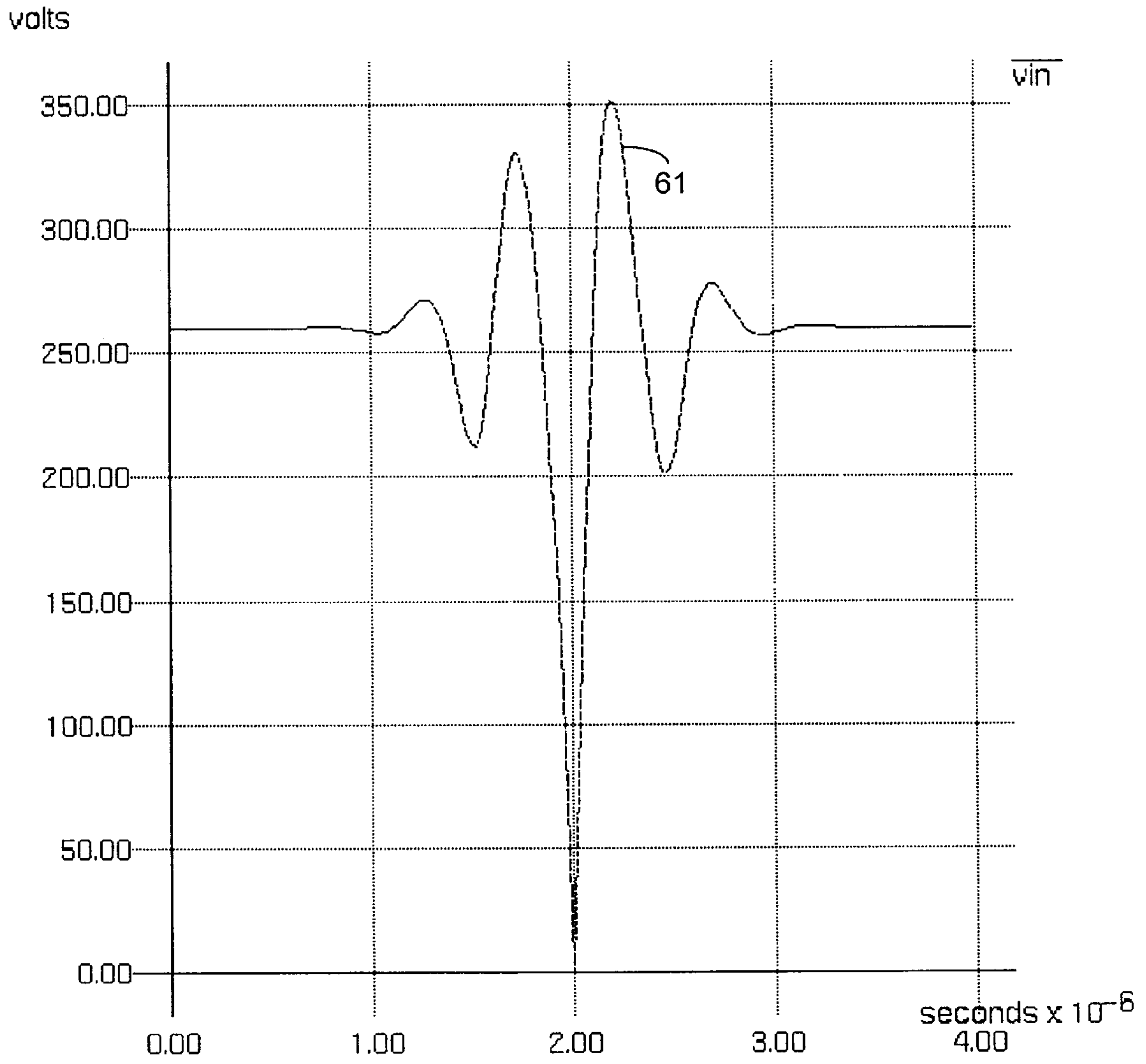
FIG. 6A is a graphical representation illustrating a predistorted voltage waveform in accordance with another aspect of the present invention.

Yet another embodiment for obtaining the compensated pressure waveform 71 of FIG. 7 and the compensated pressure spectrum and the resulting compensated pressure spectrum 81 of FIG. 8 in a MUT is to use the predistorted voltage waveform 61 of FIG. 6A.

The predistorted voltage waveform 61 of FIG. 6A is achieved through the operation of Equation 5 as follows:

$$Va=\text{applied voltage}=Q(X_o+(\int P/Zdt)+T/E_r)/eA, \quad (Eq.5)$$

where Q is the charge as described above, $X_0$ is the average gap width of a MUT, P is the acoustic pressure as given above in Equation 2, Z is the acoustic impedance of the human body (1.5 Mrayl), T is the thickness of the MUT membrane, and $E_r$ is the relative dielectric constant of the membrane.

Figure 6B:
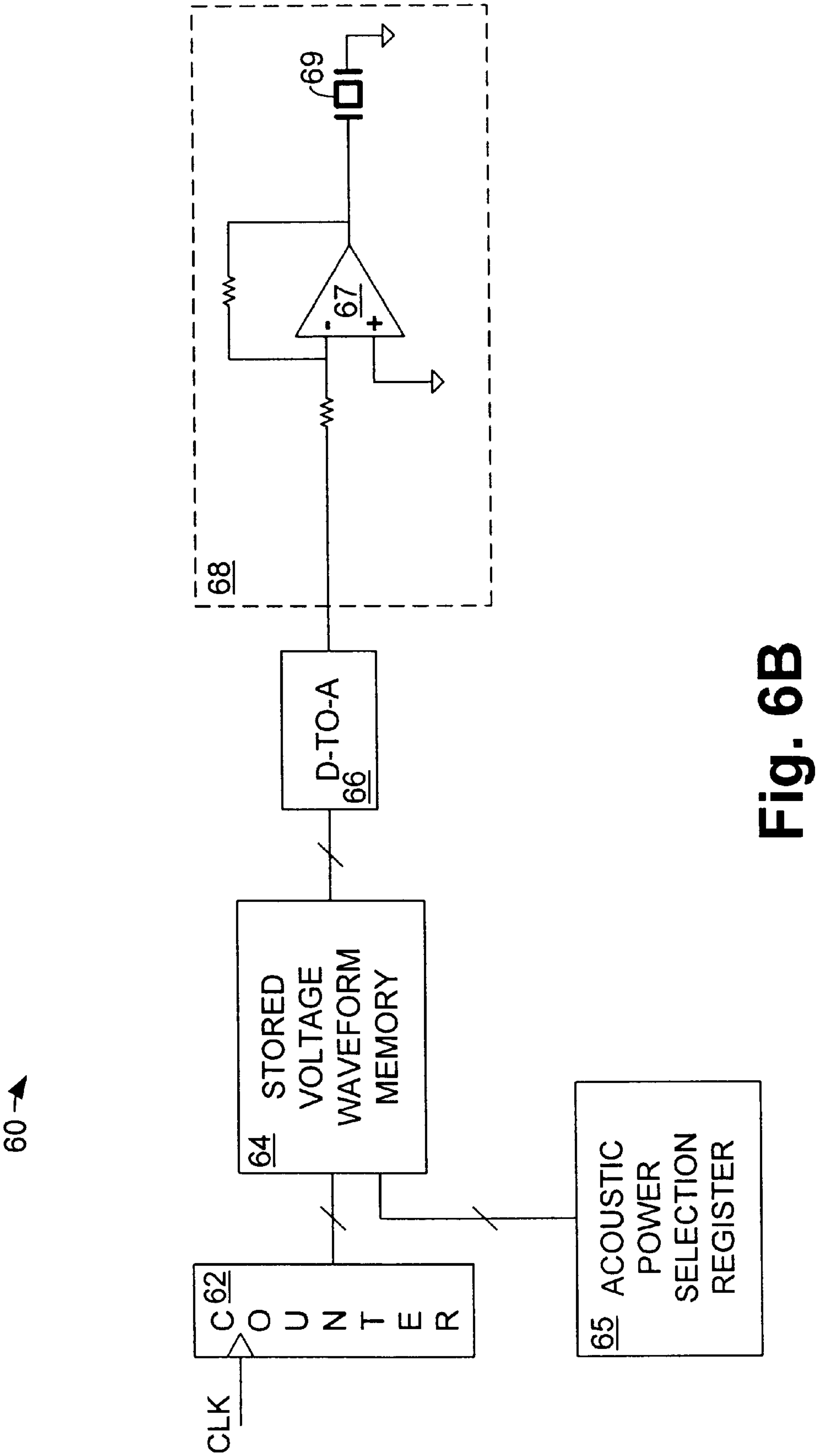
FIG. 6B is a schematic view illustrating a transmit waveform generator used to generate the predistorted voltage waveform of FIG. 6A.

The predistorted voltage waveform 61 of FIG. 6A may be applied to a MUT using the transmit waveform generator 60 of FIG. 6B. In similar fashion to that described with respect to FIGS. 4B and 5B, the transmit waveform generator 60 of FIG. 6B includes counter 62 and stored voltage waveform memory device 64. Stored voltage waveform memory device 64 includes a representation of predistorted voltage waveform 61 which is supplied to D-to-A converter 66. Similar to that described with respect to FIG. 4B, D-to-A converter 66 may be omitted in the case of all digital signal processing. The signal is then supplied to voltage amplifier 68 in which operational amplifier 67 applies the predistorted voltage waveform 61 to MUT 69.

As can be seen from that illustrated above, non-linearities within a MUT can be compensated for through the application of either a predistorted charge waveform 41, a predistorted current waveform 51, or a predistorted voltage waveform 61.

In similar fashion to that described above with respect to FIGS. 4B and 5B, the output power of MUT 69 may be controlled. Acoustic power selection register 65 may be implemented to vary the output power of the MUT 69 and may be a storage register that may index the stored voltage waveform memory device 64 to select different waveforms within the memory. These waveforms may have different amplitudes and shapes, thus enabling acoustic power selection register 65 to control the output power of MUT 69.

Figure 9:
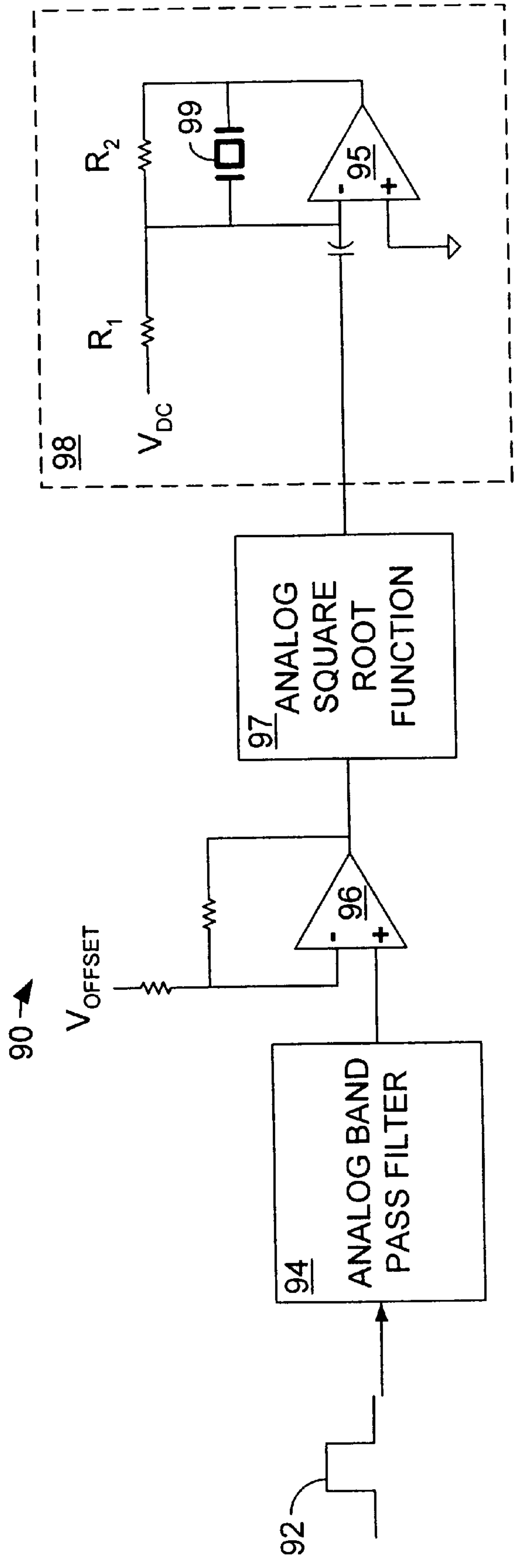
FIG. 9 is a schematic view illustrating an aspect of the invention in which analog circuitry is used to generate the predistorted input waveform.

FIG. 9 is a schematic view illustrating an aspect of the invention in which analog circuitry 90 is used to generate the predistorted input waveform of the present invention. A digital input signal 92 may be supplied to analog band pass filter 94. Analog band pass filter 94 processes the input signal 92 and supplies an analog input signal to operational amplifier 96. Operational amplifier 96 provides DC offset, if desired, and then supplies the amplified analog signal to analog square root function device 97, which operates on the amplified analog signal in order to produce a predistorted analog input signal. The predistorted analog input signal compensates for the non-linearities in a MUT as described above. The predistorted analog input signal is then supplied to charge amplifier 98 in which operational amplifier 95 supplies the predistorted analog input signal to MUT 99.

The output waveforms illustrated in FIGS. 7 and 8 are generated based upon certain specific circuit component values used in the test. Variations in the circuit, consistent with the concepts and teachings of the invention, will necessarily vary the appearance and values of the waveforms.

It will be apparent to those skilled in the art that many modifications and variations may be made to the preferred embodiments of the present invention, as set forth above, without departing substantially from the principles of the present invention. For example, the present invention can be used to excite micro-machined ultrasonic transducers with either analog or digital waveform inputs. Furthermore, the concepts of the present invention are applicable at various interrogation and receive frequencies and bandwidths. All such modifications and variations are intended to be included herein within the scope of the present invention, as defined in the claims that follow.

What is claimed is:

1. A circuit for exciting a micro-machined ultrasonic transducer (MUT), said MUT having non-linear input-output characteristics, comprising:

waveform circuitry configured to develop a predistorted waveform, said predistorted waveform related at least in part to said non-linear characteristics; and driver circuitry coupled to said waveform circuitry, said driver circuitry configured to apply said predistorted waveform to said MUT.

2. The circuit of claim 1, wherein said waveform circuitry is analog circuitry.

3. The circuit of claim 2, wherein said analog circuitry further comprises:

an analog band pass filter coupled to an analog square root function generator, said square root function generator coupled to said driver circuitry.

4. The circuit of claim 1, wherein said waveform circuitry is digital circuitry.

5. The circuit of claim 4, wherein said digital circuitry further comprises:

a counter; and a memory element coupled to said counter, said memory element configured to store said predistorted waveform.

6. The circuit of claim 1, wherein said predistorted waveform corresponds to a non-linearity of said micro-machined ultrasonic transducer.

7. The circuit of claim 1, wherein said predistorted waveform is a current waveform.

8. The circuit of claim 1, wherein said predistorted waveform is a voltage waveform.

9. The circuit of claim 1, wherein said predistorted waveform is a charge waveform.

10. The circuit of claim 1, further comprising means for varying said predistorted waveform in order to vary an output of said micro-machined ultrasonic transducer.

11. A method for exciting a micro-machined ultrasonic transducer (MUT), said MUT having non-linear input-output characteristics, the method comprising the step of:

applying to the MUT a predistorted waveform, said predistorted waveform related at least in part to said non-linear characteristics such that said predistorted waveform compensates for said non-linear response of said MUT, said predistorted waveform resulting in an output pressure wave of said MUT, the output pressure wave having less second order harmonic energy than were said MUT excited by a non-predistorted waveform.

12. The method of claim 11, wherein said predistorted waveform is a current waveform.

13. The method of claim 11, wherein said predistorted waveform is a voltage waveform.

14. The method of claim 11, wherein said predistorted waveform is a charge waveform.

15. The method of claim 11, further comprising the step of varying said predistorted waveform in order to vary an output of said micro-machined ultrasonic transducer.

16. A method for exciting a micro-machined ultrasonic transducer (MUT) comprising the step of:

generating an input pulse;

distorting the input pulse in a non-linear fashion; and applying the distorted input pulse to the MUT.

17. The method of claim 16, wherein said distorted input pulse compensates for a non-linear response of said MUT resulting in an output pressure wave of said MUT, the output pressure wave being substantially free of second order harmonic energy.

18. The method of claim 16, wherein said distorted input pulse is a current waveform.

19. The method of claim 16, wherein said distorted input pulse is a voltage waveform.

20. The method of claim 16, wherein said distorted input pulse is a charge waveform.

21. The method of claim 16, further comprising the step of varying said distorted input pulse in order to vary an output of said micro-machined ultrasonic transducer.

* * * * *